United States Patent [19]

Vermejan et al.

[11] Patent Number: 5,269,135
[45] Date of Patent: Dec. 14, 1993

[54] GAS TURBINE ENGINE FAN COOLED HEAT EXCHANGER

[75] Inventors: Alexander E. Vermejan, Mason; Paul C. Daiber, Cincinnati; Scott C. Morton, Cincinnati; Michelle L. Taylor, Cincinnati, all of Ohio

[73] Assignee: General Electric Company, Cincinnati, Ohio

[21] Appl. No.: 15,243

[22] Filed: Feb. 5, 1993

Related U.S. Application Data

[63] Continuation of Ser. No. 783,669, Oct. 28, 1991, abandoned.

[51] Int. Cl.$^5$ ............................................. F02K 3/02
[52] U.S. Cl. ................................ 60/226.1; 60/266; 60/267
[58] Field of Search ................ 60/226.1, 266, 267, 60/39.08

[56] References Cited

U.S. PATENT DOCUMENTS

| | | | |
|---|---|---|---|
| 3,638,428 | 2/1972 | Shipley et al. | 60/226.1 |
| 4,187,675 | 2/1980 | Wakeman | 60/39.75 |
| 4,254,618 | 3/1981 | Elovic | 60/226 R |
| 4,474,001 | 10/1984 | Griffin et al. | 60/267 |
| 4,546,605 | 10/1985 | Mortimer | 60/226.1 |
| 4,715,779 | 12/1987 | Suciu | 60/226.1 |
| 4,773,212 | 9/1988 | Griffin et al. | 60/39.08 |
| 4,782,658 | 11/1988 | Perry | 60/226.1 |
| 4,791,782 | 12/1988 | Seed | 60/226.1 |
| 4,914,904 | 4/1990 | Parnes et al. | 60/39.08 |
| 4,999,994 | 3/1991 | Rud et al. | 60/39.08 |
| 5,044,153 | 9/1991 | Mouton | 60/226.1 |

FOREIGN PATENT DOCUMENTS 2085082 4/1982 United Kingdom.
2152147 7/1985 United Kingdom.

Primary Examiner—Richard A. Bertsch
Assistant Examiner—Howard R. Richman
Attorney, Agent, or Firm—Jerome C. Squillaro

[57] ABSTRACT

A fan-jet gas turbine engine heat exchanger is cooled by fan air taken from the fan duct at a relatively high pressure region of the fan nozzle upstream of the fan nozzle's throat and exhausted into a relatively low pressure region of the fan nozzle upstream of the throat. One embodiment provides a cooling air duct with a forward facing scoop at the duct's inlet for capturing cooling air and providing greater dynamic pressure recovery. A diffuser is located upstream of the heat exchanger and a nozzle is located downstream of the heat exchanger with a nozzle exit that forms the cooling duct outlet and an aft facing scoop over the outlet.

4 Claims, 3 Drawing Sheets

GAS TURBINE ENGINE FAN COOLED HEAT EXCHANGER

This application is a Continuation of application Ser. No. 07/783,669,, filed Oct. 28, 1991, now abandoned.

BACKGROUND OF THE INVENTION

Field of the Invention

This invention relates to fan-jet gas turbine engine heat exchangers cooled by fan air and particularly to apparatus for cooling air/oil heat exchangers which duct fan air from and to relatively high and low pressure regions of the fan nozzle respectively.

Description of Related Art

Gas turbine engines employ many systems including engine accessories and gearboxes that require cooling. Two types of cooling systems commonly used are air-/air and air/liquid, particularly air/oil, both of which use heat exchangers employing cooling air to cool a hot fluid. A particularly useful source of cooling air is fan air from the fan duct or bypass duct, as it is often referred to.

An example of a heat exchanger that uses fan air to cool may be found in U.S. Pat. No. 4,254,618, entitled "Cooling Air Cooler for a Gas Turbofan Engine" by Ernest Elovic, which discloses an air/air heat exchanger disposed in an a cooling air duct having an inlet upstream of a fan nozzle throat and an outlet downstream of the throat. The dynamic head of the fan cooling air is recovered by diffusion and dumped into the fan duct downstream of the fan nozzle's throat. The pressure differential between the inlet and outlet of Elovic's cooling air duct is not advantageous and therefore requires a larger duct and amount of fan cooling air than would otherwise be necessary. The pressure differential could become even more disadvantageous due to shocks in the exit of the fan duct nozzle including moving shocks which may cause a flow reversal through the cooling air duct.

Fan jet engines such as the General Electric CF6-80 series of engines have in series relationship a fan, a booster, and a core engine compressor whereby a portion of the air passing through the fan is ducted to the booster and then the core engine compressor. In order to match the inlet airflow of the core engine compressor to its flight operational requirements and to prevent compressor stall, a booster variable bypass valve (VBV) is provided in the form of a booster bypass duct having an inlet between the booster and the core engine compressor and an outlet to the fan duct. Opening and closing of the booster bypass duct is conventionally provided by a circumferentially disposed plurality of pivotal doors operated by a single unison ring powered by one or more fuel powered actuators. Bellcrank linkages operably connect the pivotal bypass doors to the unison ring. The operation of the VBV is scheduled by the engine controller, either a mechanical or digital electronic type may be used.

An example of the prior art, U.S. Pat. No. 4,546,605 entitled "Heat Exchange System" by Mortimer et al, discloses an apparatus for obtaining cooling air for use in an air/oil heat exchanger from a surge bypass bleed that retains a conventional heat exchanger inlet control valve and associated plumbing, structure, and controls for its operation. A drawback common to the prior art is that a fully active heat exchanger inlet control valve, such as valve 50 in the Mortimer patent, is used to control cooling air to the heat exchanger thereby adding to the weight, complexity, and cost of the heat exchanger system. The Mortimer apparatus is typical of other conventional air/oil heat exchange systems in which the used cooling air is dumped overboard together with the energy in the flow.

U.S. patent application, Ser. No. 07/688,402 entitled "HEAT EXCHANGER SYSTEM", having one inventor in common with the inventors of this patent application, filed on Apr. 22, 1991, and assigned to the same assignee, is incorporated herein by reference as background information and provides a means to supply an air/fluid heat exchanger with cooling air that is directly controlled or scheduled by the booster variable bleed valve (VBV) and its respective control system thereby avoiding a second cooling air control system for the heat exchanger.

SUMMARY OF THE INVENTION

This invention relates to fan-jet gas turbine engine heat exchangers cooled by fan air taken from the fan duct between the inner and outer nacelle and particularly to air/oil heat exchangers that are cooled by fan air taken from a relatively high pressure region of the fan nozzle upstream of the fan nozzle's throat and exhausting it into a relatively low pressure region of the fan nozzle upstream of the throat.

The present invention provides a cooling air duct means having a cooling duct inlet at a relatively high pressure region of the fan nozzle upstream of the fan nozzle's throat, a cooling duct outlet at a relatively low pressure region of the fan nozzle upstream of the throat, and heat exchanger means disposed in the duct means therebetween.

Though a cooling duct inlet mounted flush with the fan duct walls may be used, the preferred embodiment of the invention provides the duct means with a forward facing aerodynamically sculptured scoop for capturing and directing cooling air to the cooling duct inlet. The scoop provides for using total pressure rather than static pressure to capture cooling air thereby allowing for more effective cooling and greater dynamic pressure recovery. The cooling duct inlet leads to a diffuser upstream of the heat exchanger means. Downstream of the heat exchanger is a cooling duct nozzle having a cooling duct nozzle exit that forms the cooling duct outlet. The cooling duct nozzle is designed to return the cooling air to the fan nozzle with a minimum loss of pressure and at velocity which minimizes pressure losses in the fan duct.

The preferred embodiment also provides an aft facing scoop over the outlet for directing the cooling air exhaust flow at angle that minimizes flow losses in the fan duct due to the introduction of the cooling air exhaust. The preferred embodiment also contemplates a heat exchanger means having two or more heat exchangers.

An alternate form of the invention further provides a booster bypass duct that exhausts into the cooling duct between the cooling duct inlet and heat exchanger for further cooling the heat exchanger using the compressor surge bypass system.

Among the advantages provided by the present invention is an improved cycle efficiency of the turbofan engine due to recovery of the mass cooling air flow and the waste heat of the heat exchanger.

Another benefit is a lower average fluid operational temperature thereby yielding a longer life for the oil and bearings and other components lubricated by oil or other fluids cooled with the present invention.

The present invention also allows for a passive system using the scheduling of fan air and in, one embodiment, of booster bypass air to control the amount of cooling air going through the heat exchanger thereby eliminating a separate heat exchanger inlet control valve and its associated control system and plumbing that adds weight, complexity, and cost to an engine's heat exchanger system. The elimination of a separate heat exchanger control valve also improves engine reliability and decreases maintenance costs.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
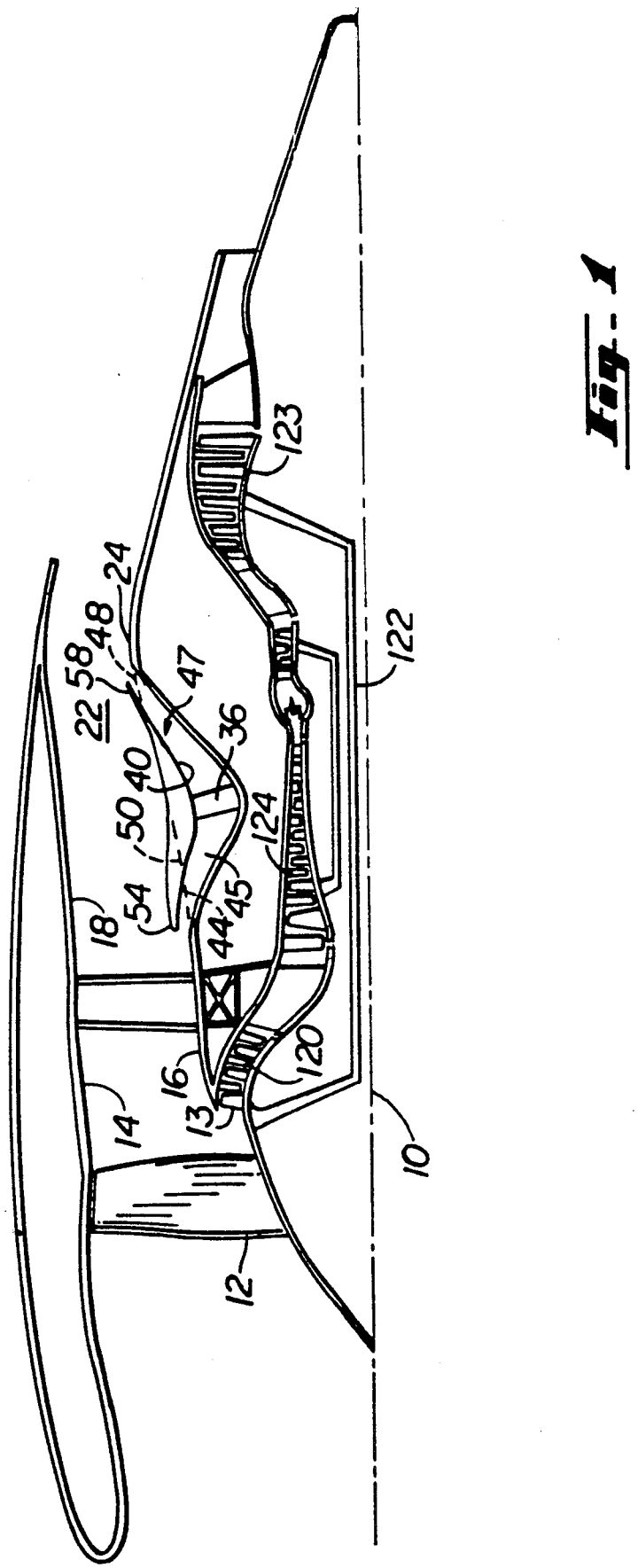
FIG. 1 is a cross-sectional view of a fan-jet engine having a heat exchanger system in accordance with the preferred embodiment of the present invention.

This invention is specific to a fan-jet engine of the type exemplified by the GE CF6, CFM, and soon to be manufactured GE90 series of engines by General Electric, the assignee of this patent application. Illustrated in FIG. 1 is a fan-jet engine 10 having a fan 12 that pressurizes and feeds air to a fan bypass duct 14 disposed between inner fan case 16 and outer fan case 18 and to booster 120 located at a forward portion of core engine flow path 13. Fan air is exhausted from bypass duct 14 through a fan nozzle generally shown at 22 having a throat 24. Booster 120 rotates together with fan 12 on a low pressure rotor 122 driven by a conventional low pressure turbine 123 and further compresses air that is then ducted to a conventional core engine compressor 124.

A heat exchanger means 36 is disposed in a cooling air duct 40 that is generally disposed radially inward of inner fan case 16. Cooling air duct 40 has a cooling duct inlet 44 at a relatively high pressure region of fan nozzle 22 upstream of fan nozzle throat 24, a cooling duct outlet 48 at a relatively low pressure region of fan nozzle 22 upstream of throat 24, and heat exchangers 36a and 36b disposed in the cooling duct between cooling duct inlet 44 and cooling duct outlet 48. A diffuser 45 is disposed in cooling duct 40 between cooling duct inlet 44 and heat exchanger 36 so as to maximize the heat transfer effectiveness and minimize the size of heat exchanger means 36. A cooling duct nozzle 47 is provided between cooling duct outlet 48 and heat exchanger means 36 having a cooling duct nozzle exit that generally coincides with cooling duct outlet 48. Cooling duct nozzle 47 increases the velocity of and recovering the energy in the cooling air flow to provide thrust in nozzle 22 with a minimum of aerodynamic flow loss due to a velocity differential between the fan flow and the cooling air flow at cooling duct outlet 48. Cooling duct inlet 44 and cooling duct outlet 48 may be mounted flush with inner fan case 16 along nozzle 22 so as to provide a smooth uninterrupted surface as indicated by dashed line 50.

Figure 2:
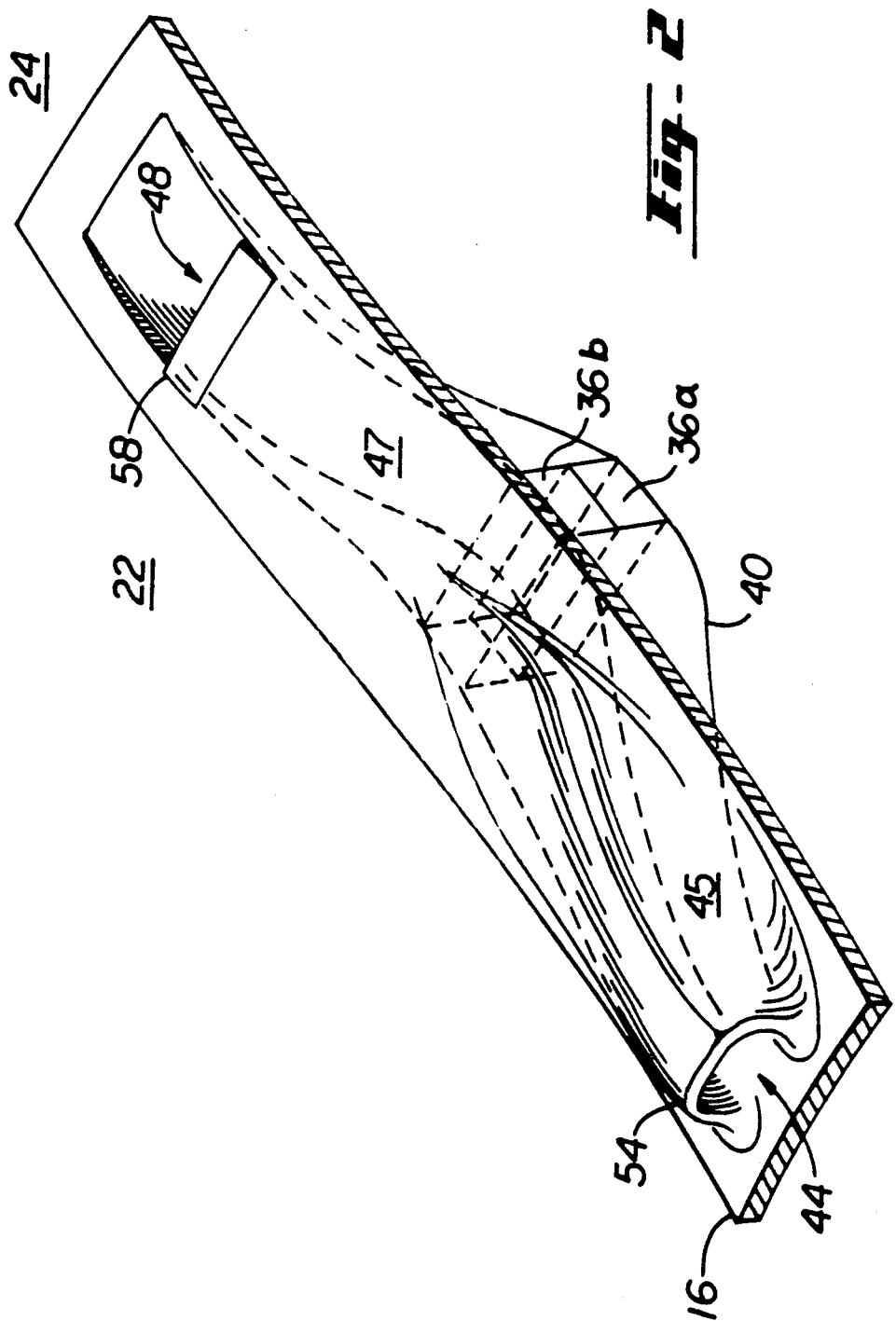
FIG. 2 is a perspective view of the cooling duct means of the heat exchanger system in FIG. 1.

FIG. 2 provides a more detailed illustration of the preferred embodiment of the present invention that provides cooling duct 40 with a forward facing scoop 54 at cooling duct inlet 44 for capturing fan airflow with greater dynamic pressure that can be recovered. An aft facing scoop 58 is provided at cooling duct outlet 48 for directing the exhaust flow from cooling duct 40 in a direction generally parallel to the fan flow at that point in fan nozzle 22. Heat exchanger means 36 of FIG. 1 is shown in its preferred embodiment comprising a plurality of heat exchangers illustrated in FIG. 2 as two air-/oil heat exchangers 36a and 36b.

Figure 3:
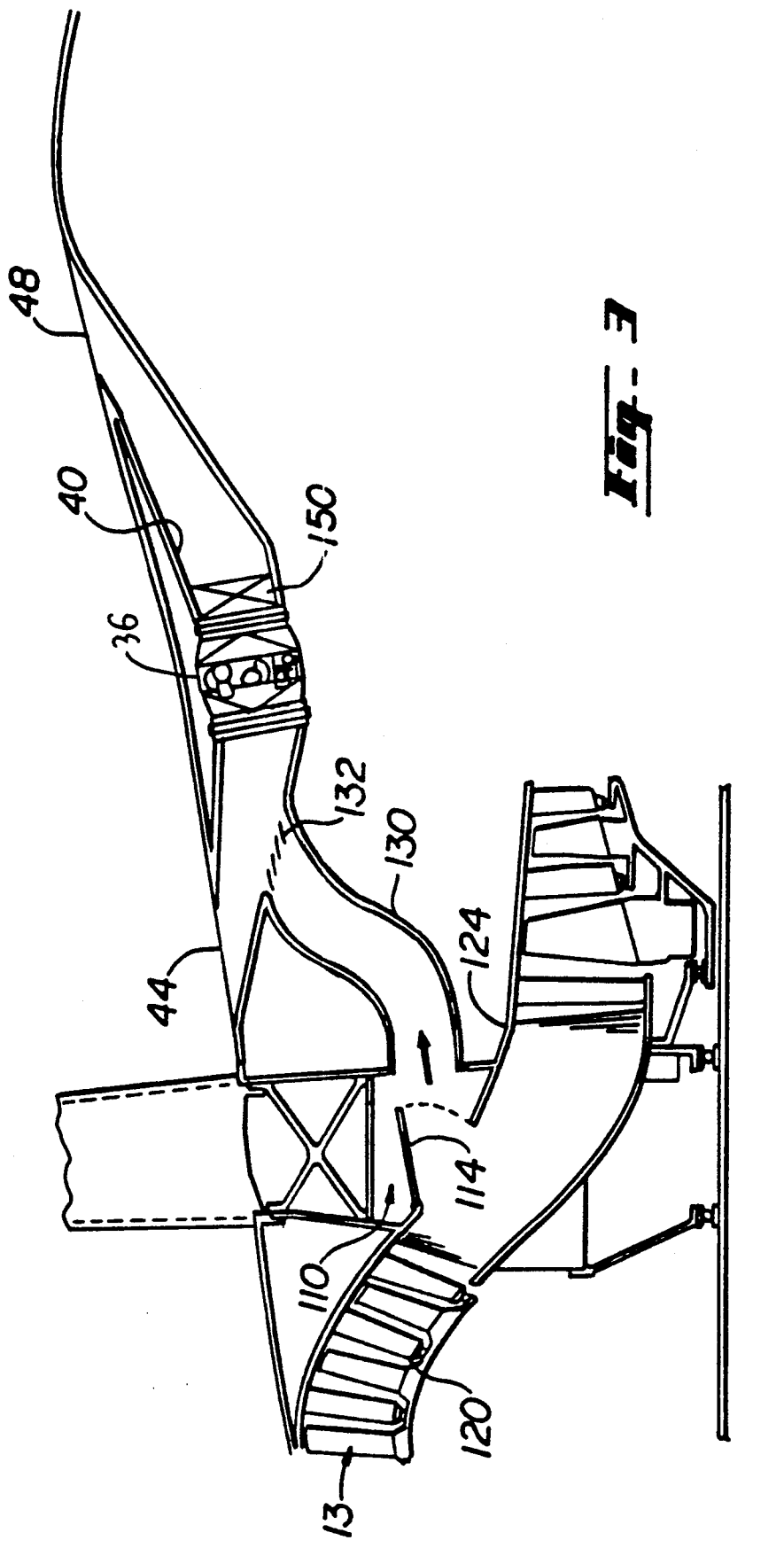
FIG. 3 is a cross-sectional view of a fan-jet engine having a heat exchanger system in accordance with an alternate embodiment of the present invention.

FIG. 3 illustrates an alternate embodiment of the present invention which further provides a second source for heat exchanger cooling air from a booster bypass system generally indicated at 110 which supplies cooling air from core engine flow path 13. Cooling air from core engine flow path 13 is bled by a variable bypass valve in the form of a conventional pivotable booster bypass door 114 located between booster 120 and core engine compressor 124. Booster bypass door 114 is controlled by booster bypass door system 110 that includes conventional actuation and control means, not shown. A booster bypass cooling duct 130 provides a flowpath for the booster bypass cooling air that is bled through pivotable door 114 to a booster cooling air inlet 132 to cooling air duct 40 that is disposed between cooling duct inlet 44 and heat exchanger means 36.

Another alternative embodiment illustrated in FIG. 3 is a cooling air duct valve 150 disposed in cooling air duct 40 which may be used either in place of or in conjunction with booster bypass system 110 to control or modulate cooling air flow through cooling air duct 40.

While the preferred and an alternate embodiment of our invention has been described fully in order to explain its principles, it is understood that various modifications or alterations may be made to the preferred embodiment without departing from the scope of the invention as set forth in the appended claims.

We claim:

1. A cooling apparatus for a heat exchanger used with an aircraft gas turbine engine having a fan duct including a fan nozzle and fan nozzle throat, said cooling apparatus comprising:

a cooling air duct means, said cooling air duct means having a cooling duct inlet at a relatively high pressure region of the fan nozzle upstream of the fan nozzle throat and a cooling duct outlet at a relatively low pressure region of the fan nozzle upstream of the fan nozzle throat, a heat exchanger means disposed in the duct means between said cooling duct inlet and said cooling duct outlet, a diffuser disposed in said cooling air duct means downstream of said cooling duct inlet and upstream of said heat exchanger means, a cooling duct nozzle disposed in said cooling air duct means downstream of said heat exchanger means, and said cooling duct nozzle having an exit generally at said cooling duct outlet, a forward facing scoop at said cooling duct inlet for capturing cooling air in the fan duct, an aft facing scoop at said cooling duct outlet for directing the cooling air exhaust flow, a booster bypass system including a booster bypass valve disposed in a core engine flow path between booster and core engine compressor sections of the engine, a booster bypass cooling duct providing a flowpath for booster bypass cooling air from said booster bypass valve to said cooling air duct means.

2. A cooling apparatus as claimed in claim 1 wherein said booster bypass valve is a variable valve.

3. A cooling apparatus as claimed in claim 2 further comprising a cooling air duct valve disposed in said cooling air duct means.

4. A cooling apparatus as claimed in claim 2 wherein said booster bypass valve is a pivotable door.

* * * * *